United States Patent
Pieroth et al.

[19]

[11] Patent Number: 6,057,646

[45] Date of Patent: May 2, 2000

[54] LIGHT LEVEL MONITORING AND ATM CONTROL SYSTEM FOR AUTOMATED TELLER MACHINE WHICH DIRECTLY MEASURES LIGHT SOURCE LUMINANCE TO INDIRECTLY DETERMINE AREA ILLUMINANCE

[76] Inventors: Robert F. Pieroth, 654 S. Vermont Ave., Glendora, Calif. 91740; Vytas V. Pazemenas, 26302 Rosa St., Laguna Hills, Calif. 92656

[21] Appl. No.: 09/123,918

[22] Filed: Jul. 28, 1998

Related U.S. Application Data

[60] Provisional application No. 60/053,877, Jul. 28, 1997.

[51] Int. Cl.[7] ................................................. H05B 37/00
[52] U.S. Cl. .......................... 315/149; 315/158; 340/540
[58] Field of Search ................................. 315/149, 150, 315/152, 155, 158; 340/540, 641, 642

[56] References Cited

U.S. PATENT DOCUMENTS 5,774,052  6/1998  Hamm et al. ............................ 340/540

*Primary Examiner*—David H. Vu
*Attorney, Agent, or Firm*—Myers, Dawes & Andras LLP

[57] ABSTRACT

The invention is a light level monitoring and ATM control system which is designed for operation at a typical automated teller machine (ATM). The system is used to ensure that a user area associated with the ATM is maintained at a minimum light level. If the user area drops below a predetermined minimum, the preferred system disables the ATM and illuminates a warning sign to deter bank customers from approaching the area. The system does not directly measure the light level in the user area, but rather uniquely, indirectly determines the light level in the user area by measuring the output of a light fixture that illuminates the user area at a point remote to the user area and by calibrating the remote measurement relative to a measured value and a minimum value in the user area. The system, by indirectly determining the light level in the user area, does not suffer from apparent changes in light level in the user area due to the presence or absence of a customer or the color of a customer's clothing. The light sensors associated with the light fixtures may beneficially be hardwired and remotely powered, not battery powered, because of their proximity to the wiring plant associated with the ATM and the light fixtures.

19 Claims, 4 Drawing Sheets

LIGHT LEVEL MONITORING AND ATM CONTROL SYSTEM FOR AUTOMATED TELLER MACHINE WHICH DIRECTLY MEASURES LIGHT SOURCE LUMINANCE TO INDIRECTLY DETERMINE AREA ILLUMINANCE

This application claims the benefit of U.S. Provisional Application No. 60/053,877, filed Jul. 28, 1997.

BACKGROUND OF THE INVENTION

1. Field of the Invention

The present invention relates generally to lighting control systems and, more particularly, to a lighting monitoring system for use with an automated teller machine (ATM) which directly measures source luminance to indirectly determine in the area surrounding the ATM and which effectively alerts customers in the event of a dimly lit and potentially dangerous condition.

2. Description of the Related Art

The typical automated teller machine (ATM) installation includes customer interactive elements such as a keypad and currency door, as well as remote communication elements such as telemetry equipment, which communicates with a central station to notify the station when the machine is out of cash or when the machine encounters mechanical failures. The typical ATM installation also includes shut down mechanisms for closing the cash door and taking the machine out of service.

The growing popularity of ATM use, however, has resulted in an increase in crimes that take place near the ATM. As a result, various governmental bodies have passed laws and regulations which mandate minimum light level requirements in the area surrounding the ATM. The State of California, for example, requires that the level of illumination in the area surrounding the ATM be at least 10 foot-candles when measured anywhere among an arc located at a five (5) foot radius from the ATM and at thirty-six (36) inches above grade.

In view of the fact that dimly lit ATM installations are more susceptible to crime, some of the newer ATM's include a system for notifying the central location when the ambient lighting about the ATM installation falls below a certain minimum threshold or value. Such systems may also disable the ATM if the illumination drops below the prescribed minimum.

The system disclosed in U.S. Pat. No. 5,774,052 is typical of the current light level monitoring systems that use photosensors to directly measure illumination arriving in the area surrounding the ATM. FIG. 4 of the '052 patent, for example, shows an ATM 12 that is illuminated by two lamps 21, 21 and a light sensor assembly 23S that is remotely located relative to the ATM 12 so as to measure the level of illumination in the area surrounding the ATM. Unfortunately, this approach to measuring illumination has several possible drawbacks.

First, because the light sensor assembly 23S must be remotely positioned relative to the ATM 12 in order to "see" the illuminated customer area, the assembly 23S must often be mounted in a position that is not conveniently serviced with wires that supply power or return light measurement signals. Accordingly, it is often necessary to use battery powered light sensor assemblies that use wireless links such as radio frequency (RF) communications, a situation that is obviously undesirable in the context of consumer safety since the batteries will discharge over time and must, therefore, be frequently serviced. The '052 patent, in fact, focuses on an RF system wherein the light sensor assembly 23S only transmits when it determines that the light is below a certain level. It seems, therefore, that the light sensor assembly could fail to communicate a low light level condition due to a malfunction or due to insufficient battery power.

Second, directly measuring the illumination in the customer area in front of the ATM, or elsewhere, without using an incident light meter is undesirable because the measured value is determined by the reflectance of the ATM area, which may change due to the presence of a customer or other environmental conditions. For example, if a customer wearing dark clothing stands before the ATM, the reflected illumination from the light sources will be reduced by the customer's clothing. The measured illumination, therefore, will differ from illumination that would be measured by an incident light meter. The same phenomena may occur when rain covers the illuminated area with a layer of water, which greatly changes the reflection characteristics of dry concrete.

Accordingly, there is a need for a light level monitoring and control system for automated teller machines that does not depend on the reflectance of the illuminated area, but rather directly measures one or more light sources to indirectly determine the area illumination.

SUMMARY OF INVENTION

The invention may be regarded as light level monitoring and control system for use with an automated teller machine (ATM) having a user area that is illuminated by a light fixture, the control system comprising a light sensor for measuring light energy emanating from the light fixture and outputting a signal; an illuminated display operatively connected to the controller for warning a distant user that the ATM is disabled; and a controller including: means for inputting a measured value corresponding to a measured incident light reading in the user area when the area was illuminated by the light fixture; means for inputting a specified minimum light level; means for receiving the signal from the light sensor; calibration means for determining a minimum allowable signal from the light sensor that corresponds to the minimum incident light level based on the measured value, the minimum incident light level, and the signal from the light sensor; means for determining if the signal from the light sensor is below the minimum allowable signal; means for disabling the ATM if the signal from the light sensor is below the minimum allowable signal; and means for illuminating the display if the signal from the light sensor is below the minimum allowable signal.

BRIEF DESCRIPTION OF THE DRAWINGS

The just summarized invention may best be understood with reference to the Figures of which.

BRIEF DESCRIPTION OF THE PREFERRED EMBODIMENTS

Figure 1:
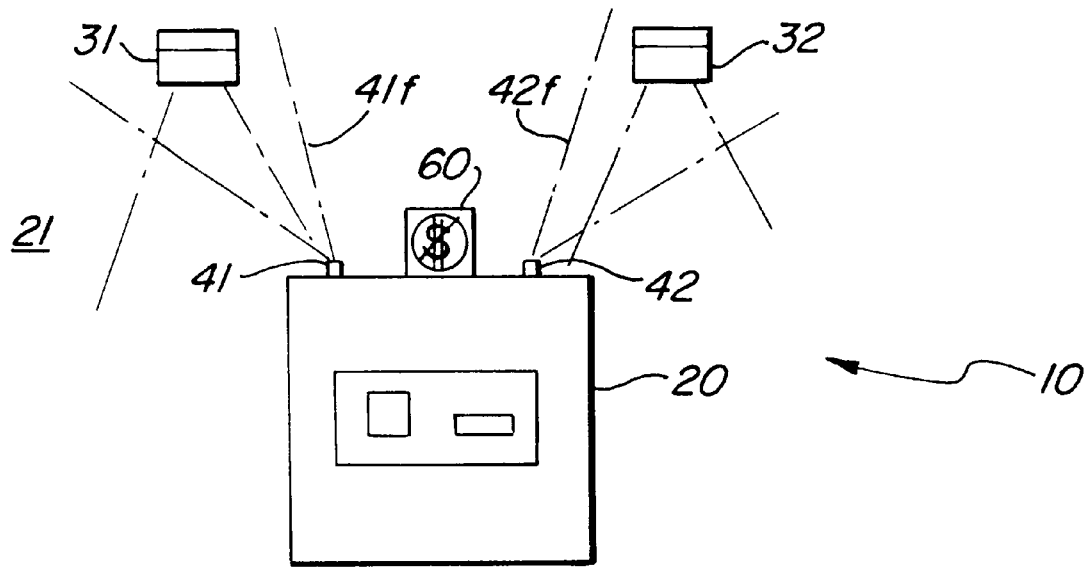
FIG. 1 is a schematic, front elevation view of the present invention as used with a typical ATM installation having two light fixtures located above and to either side of the ATM.
Figure 2:
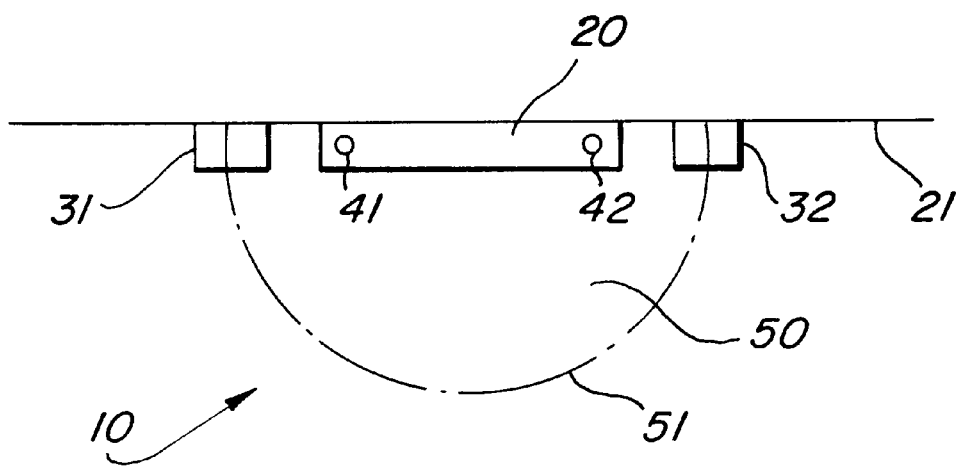
FIG. 2 is a top plan view of FIG. 1 showing the five foot radius within which the State of California mandates minimum illumination levels.

FIG. 1 shows a typical ATM installation 10 wherein an ATM 20 is mounted in a wall 21 and illuminated by a pair of light fixture 31, 32 which are located on the wall 21, above the ATM 20 and to either side thereof. The light fixtures 31, 32, as suggested by FIG. 2, provide a desired level of illumination within a user area 50. The user area 50 is open to various definition of course, but in the State of California, where banks are required to provide at least ten (10) foot-candles of illumination as measured at thirty-six (36) inches above grade and anywhere along a five (5) foot radius, the user area 50 may be regarded as bounded by the arc 51 which circumscribes the five foot radius related to the mandatory minimum light levels.

FIGS. 1 and 2 also show first and second light sensors 41, 42 and an illuminated alert sign 60, described more fully below, which are a part of a preferred embodiment of the present invention when used with the ATM installation 10 having first and second light fixtures 31, 32. The first and second light sensors 41, 42 each have a field of view 41f, 42f, respectively, which causes the sensors to directly measure the luminous flux leaving the light fixtures 31, 32 rather than directly measure light reflected from the user area 50 as typical of the prior art. Accordingly, the measurement is completely unaffected by a customer entering or exiting the user area 50, by the number of customers or the color of their clothes, or by weather conditions.

Moreover, because the sensors 41, 42 measure the luminous intensity of the light fixtures 31, 32, rather than the light reflected from the illuminated user area 50, they may be beneficially mounted near the light fixtures 31, 32. Possible mounting sites for the sensors 41, 41 include, but are not limited to, the wall 21, the base of the light fixtures 31, 32, or the ATM's frame or "surround." These mounting sites are desirable because they are near the ATM and existing wires, making it significantly more practical to run hardwired power and communication links to the sensors 41, 42 and unnecessary, therefore, to use battery-powered light sensors and RF transmitters that require more frequent maintenance to verify operational status and prevent failure and whose transmissions are regulated by the FCC.

Figure 3:
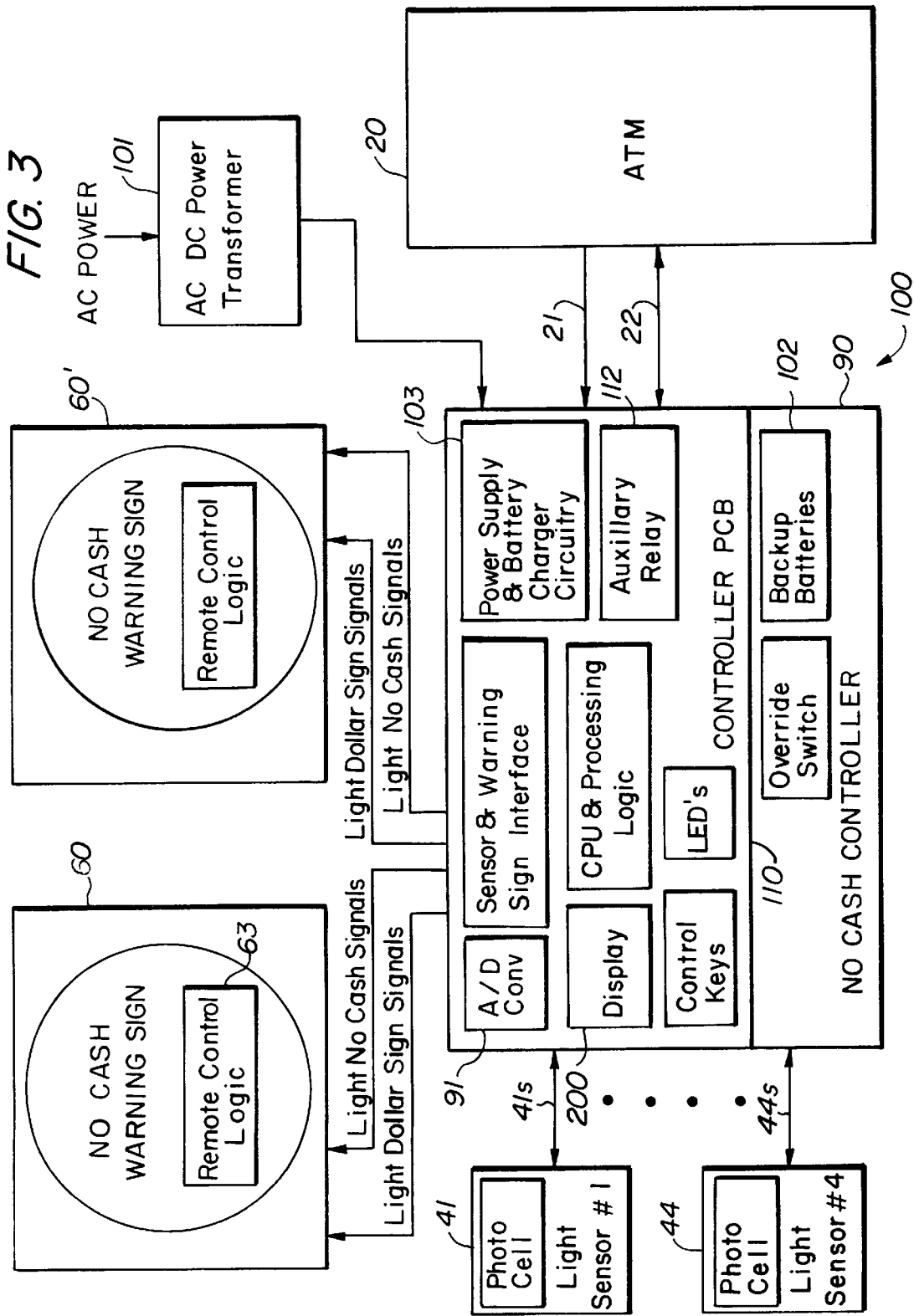
FIG. 3 is a block diagram of a presently preferred light level monitoring and ATM control system according to the present invention.

FIG. 3 shows a block diagram of a preferred light level monitoring and ATM control system 100 according to the present invention. As shown, the system 100 generally comprises a controller 90 which interfaces with the ATM 20, the light sensor 41 (four are shown, but less or more may be used), and the warning sign 60. The controller 90 normally operates from conventional AC power and an AC/DC power supply 101 (shown external, but may be internal), but includes a backup battery 102 that is continually charged, under normal operating conditions, by the power supply and battery charger circuit 103. The battery 102 provides operational power to the controller 90 and illuminate the warning sign 60 in the event that the unsafe light condition is due to a power outage. The preferred battery 102 is a sealed lead acid battery, but other battery systems may be used.

Figure 5:
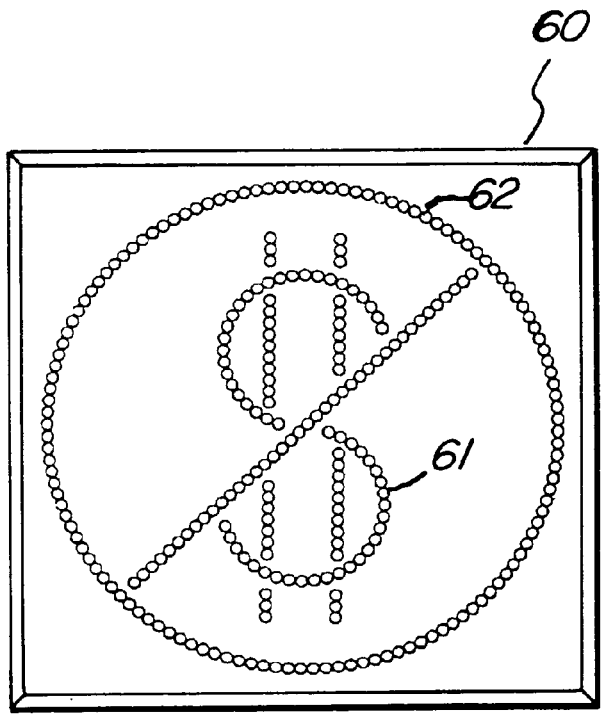
FIG. 5 is a front elevation view of a presently preferred sign or "annunciator" which effectively warns potential ATM customers from a distance that the ATM is presently unable to dispense cash owing to a low light level condition or other reason.
Figure 6:
FIG. 6 is a side elevation view of the sign of FIG. 5.
Figure 7:
FIG. 7 is a bottom view of the sign of FIG. 5.

The system 100, as shown, includes light sensors 41 to 44 which measures the luminous intensity of a nearby light source 31 and a controller 90 which receives light level signals 41s to 44s via an A/D converter 91 and, based on a previous calibration, determines whether or not an alarm condition exists by comparing the sensed light level to a minimum calculated value as judged to be satisfactory for safe operation. In the event the light falls below the threshold level, the controller passes a signal to the ATM controller which shuts down the ATM and closes the cash door. The invention also includes a prominent no-cash sign 60 which preferably uses an illuminated, language independent icon comprising a dollar sign with a diagonal slash. Other signs may be used. Other possible icons include an "X" or a "don't walk" hand symbol comparable to that used at crosswalks. Language based signs such as "CLOSED" or "OUT OF SERVICE" are also possible. Whatever symbol or words are used, the sign 60 should be sufficiently large and prominent that it can be observed from the street and from a sufficient distance to prevent customers approaching the proximity of the installation in the event of an inoperative ATM, particularly where the reason is an unsafe lighting condition. The preferred sign 60 uses low power drain and long life LED's, as shown in FIG. 5, so that the sign 60, if being powered by the backup batteries, will operate until day break.

Although not shown in FIG. 3, the controller 90 may include a telemetry facility, which notifies a central station that the ambient light conditions at the ATM location are below the minimum level by way of broadcast or via ordinary telephone lines.

Figure 4:
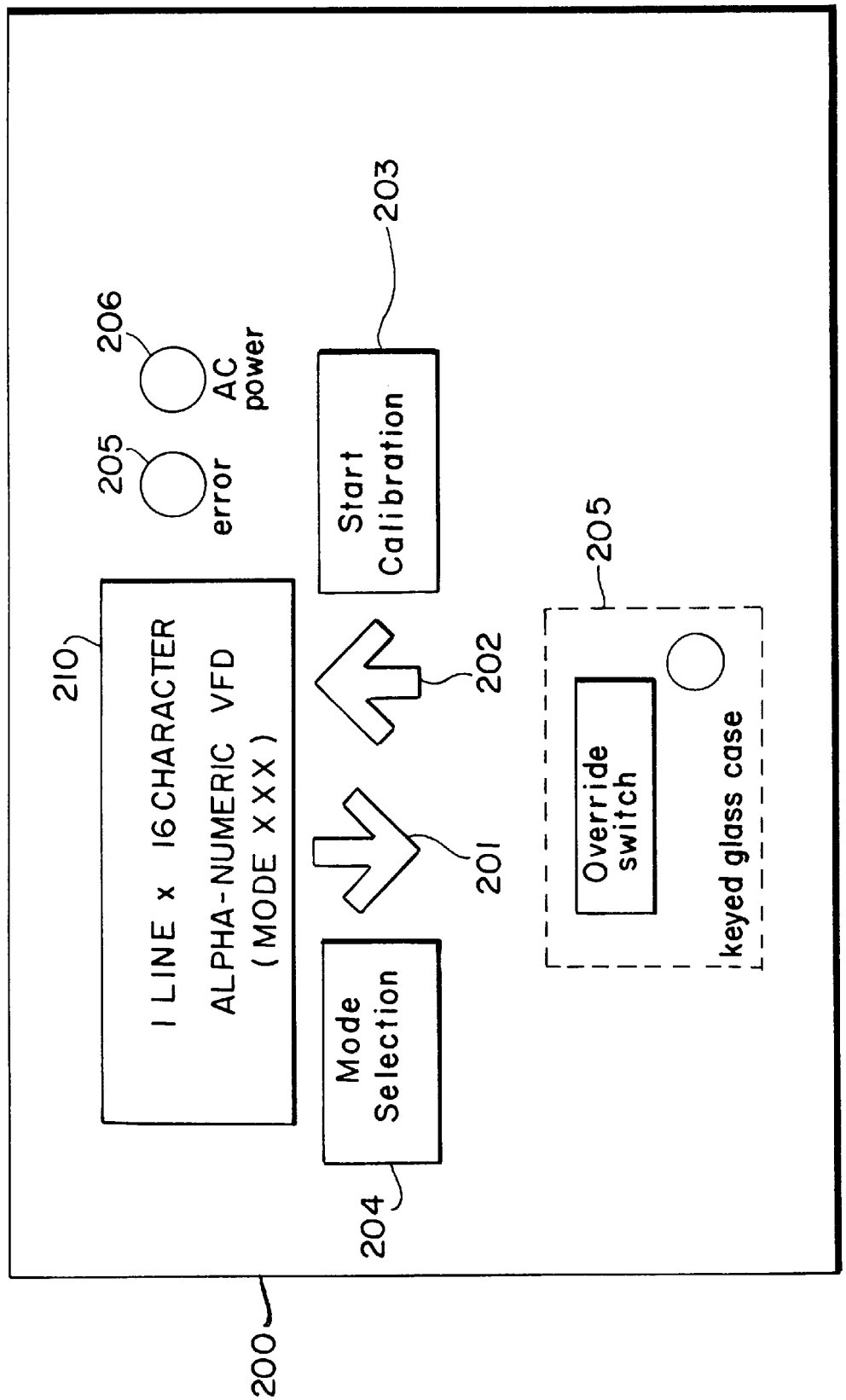
FIG. 4 shows the presently-preferred interface panel used in configuring and maintaining the light level monitoring and ATM control system of FIG. 3.

The preferred system 100 includes circuitry for both local and remote testing capability. As to local testing, FIG. 4 shows that the preferred control system 100 includes a display 200 which incorporates various controls and indicators including a vacuum fluorescent display (VFD) for local viewing. As to remote testing, FIG. 3 shows that remote control logic 63 is preferably mounted in the face of the display 60 so that a security officer may remotely verify system operation. The preferred system operates with a suitable wireless transmitter such as an infrared hand held transmitter with a broadcast range of up to about 30 feet. The preferred system flashes or "winks" the entire display 60 to permit the mobile security officer to rapidly and conveniently check the operation of dozens of ATM installations without ever leaving his vehicle. Remote testing may also be performed by using a serial interface to a modem or other communication device.

The invention may be better understood in view of the following, presently preferred specifications:

Product Overview

The "No Cash" ATM Security Advisor 100 monitors light levels at or near an ATM 20. If the detected light level fall below a level that compromises the safety of an ATM customer, or the ATM is not operating or out of cash, the No Cash indicator 60 (preferably a red circle and a red forward slash over a green dollar sign), which symbology is a registered trademark, is lit, and the ATM 20 is prevented from dispensing cash. When the light level is above a safe threshold, either the indicator is completely turned off or only the dollar sign is lit.

Light Sensor

The preferred light sensor (e.g. 41) must detect incident illumination from 0–500 foot-candles. The sensors (e.g. 41, 42) are mounted facing the ATM light source (e.g. 31, 32) and signals from the sensors are amplified and transmitted to the Controller 90. The preferred light sensors will use a photodiode with viewing angle of approximately 70 degrees. The preferred sensor includes an amplifier and is implemented on small PCB. The preferred system 100 includes up to four sensors 41 to 44. The system 100, however, may operate with only one or two sensors. The extra sensors may be used to implement reflected light sensors, for example, to detect ATM parking lot lighting from a distance.

Light Detection Alarm Delay Time

Light Detection Alarm Delay Time is selectable by the operator. It can be set from 1 to 30 minutes to help avoid false triggers. The Light Detection Algorithm uses this parameter to determine when to trigger the No Cash Alarm.

Light Detection Algorithm

The Controller detects the Light Sensor output. The output values from all sensors associated with a particular area (e.g. area 50 in front of the ATM 20) are monitored by the Controller. In the simplest application, the contribution of each light source to the ATM area illumination is the same. For this case, the outputs of the light sensors are summed. If the sum of the measured light from all light sensors falls below the light level sum threshold level (determined at calibration time) for the selected Light Detection Alarm Delay Time, a No Cash Alarm is triggered.

When the illumination contribution from each light source is not identical, each light source is covered in turn during calibration to determine its contribution to the ATM area illumination. The calibrated contribution values are then used to compute the change in ATM area illumination when the lights dim or are extinguished.

When the No Cash Alarm is not triggered, the Cash Sign may or may not have the dollar sign lit as desired by the operator.

Controller

The Controller 90 houses the batteries 102 and Controller Board 110. The Controller Board 110 contains the electronics and software for: interfacing to the light sensors 41–44, controlling the Cash Sign 60, calculating illumination, calibrating the system, controlling the ATM output relay 112, indicating system status in a display 200 (i.e. with LEDs or a VFD), running self-diagnostics, and a serial interface (not shown) to support calibration and external computer diagnostics.

The batteries 102 are preferably placed in an independent compartment of the Controller housing. The LEDs, Display 200, and Controller Keys will be mounted on the Controller Board 110.

The Controller Board 90 has a removable screw type terminal block to interface signals from the other parts of the system (sensors, sign boards, batteries, power supply, and Override switch strip). Cable from the sensors and the sign boards may be as long as 100 feet.

Cash Sign

The preferred Cash Sign 60 includes indicators composed of green LEDs 61 and red LEDs 62 mounted on a 12 in×12 in printed circuit board. As shown in FIG. 5, the green LEDs 61 form a dollar sign symbol, and the red LEDs 62 form a circle around the dollar sign with a forward slash going through the dollar sign symbol.

The preferred LEDs 61, 62 have a luminous intensity of at least 500 millicandelas and a viewing angle of approximately 65 degrees.

The Cash Sign 60 also contains the circuitry 63 (see FIG. 3) to support remote control activation for testing the system. The presently preferred wireless remote activation technology is infrared, but other technologies are possible. Remote activation and testing is also possible, for example, using a modem or other data communications device connected to the serial port.

The preferred system 100 supports the use of two Cash Signs (e.g. 60 and 60' as shown in FIG. 3), although systems 100 may only be configured with one Cash Sign 60.

Power Supply

The preferred power supply is a UL approved 13.8 volt AC/DC receptacle-mounted power supply 101 having sufficient current capacity to power the controller 90, charge the back battery 102, and power two Cash Signs 60, 60'.

Battery Charger and Battery Backup

The system may be configured with either one or two batteries 102.

When operating from AC line, the preferred system will continuously charge the batteries with the current-limited constant voltage 13.8-volt power supply.

The batteries will be rechargeable 12-Volt sealed lead acid batteries. The batteries will provide sufficient power capacity for the Controller, four Light Sensors, and two Cash Sign Boards at least 12 hours. While operating on battery, the Cash Sign will flash the No Cash indicator continuously.

The charging circuitry will charge the 12-Volt batteries to full capacity within 16 hours.

Light Level Detection Calibration

The light level detection for triggering a No Cash Alarm Condition is calibrated during system configuration.

The calibration may proceed as follows:

Incident light is manually measured (in e.g. foot-candles) in the area 50 where an ATM Customer would stand during a transaction.

The incident light measured in step #1 (e.g. 15 foot-candles) is entered into the system using arrow keys 201, 202 located on the Display 200 of the Controller 90 (see FIG. 4).

A desired low light level is also entered in foot-candles (e.g. 10 foot-candles) using the arrow keys 201, 202.

A Calibration Key 203 on the display 200 is pressed, causing the Controller 90 to calculate the light source intensity level needed for detection of the low light level condition.

The Controller 90 will may then perform the internal configuration as follows:

In the case where all light sources contribute equally to the ATM area illumination, when the Calibration Key 203 is pressed, the Controller sums the light level readings (in arbitrary units) from all of the light sensors (e.g. 41, 42) associated with light fixtures (e.g. 31, 32) illuminating the area in question (e.g. 50).

The Controller calculates the ratio of the entered lighting threshold level to the entered measured lighting (e.g. if the minimum light level is 10 foot-candles and the measured illumination was 15 foot-candles, the ratio is 10/15 or 2/3 or approximately 0.67).

The calculated ratio (e.g. 0.67) is multiplied times the sum acquired in step 1. This result becomes the light level sum threshold used to trigger a low lighting level alarm.

In the case where a plurality of light sources make unequal contributions to the illumination of the area surrounding the ATM, a modified calibration procedure may be implemented wherein each of the light sources are covered, in turn, and corresponding light level readings are made in connection with a measurement of the luminous flux from each such light source. In this fashion, it is possible for the Controller to receive and account for the "weighted contribution" of each source and thereby know the effect on the illumination of the area surrounding the ATM due to a later reduction in output or extinction altogether of a particular one of the light sources.

Override Switch

An Override Switch 205 is preferably provided to allow ATM administrator to disable operation of the system. If the Override Key Switch 205 (mounted on the Controller Front Panel 200 as shown in FIG. 4) is switched to the disable position, power to the Cash Sign 60 will be removed, in effect disabling the System 100 from normal operation and the Override LED will be lit. In addition, the Controller 90 will allow the ATM to function independent of the lighting conditions.

ATM Interface

The Controller 90 monitors an Out of Cash Signal and other ATM Status Signals 21 transmitted by the ATM 20. It also controls an relay 112. On detection of a low ATM lighting condition or a total power failure of the Controller, the relay 112 is de-energized and closes the contacts to signal the alarm condition. The relay contact provide an interface to the ATM 20 System by way of the ATM Control Signals 22 such that the detection of the low lighting condition result in the ATM System being disabled from dispensing cash.

Fault or Alarm Conditions

No Cash Alarm—When ATM light level is detect to be insufficient, the Controller 90 preferably sends the appropriate signals to flash the No Cash indicator 60 at a one hertz rate and control the ATM Auxiliary Relay 112 to disable the ATM 20. In addition, the VFD 210 displays an alphanumeric description and the error LED is lit.

Sign/Annunciator Test—The Controller 90 tests operation of the annunciator (or Cash Sign 60) periodically. The operator uses the Controller front panel user-interface 200 to set the frequency of the test. If the annunciator Test fails the VFD 210 displays an alphanumeric description and the error LED is lighted.

Battery Load Test—The Controller periodically tests the battery for sufficient power. If the Backup Battery Test fails, the VFD 210 displays an alphanumeric description and the error LED is lighted.

ATM Not Available—If the ATM 20 transmits an "ATM Not Available" signal to the controller 90, the VFD 210 displays a corresponding message and the error LED is lit and the system automatically activates the Cash Sign 60. The Cash Sign 60 will remain lit, preferably flashing, until the signal returns to a low level. Note that the voltage level of the ATM Not Available signal may be as high as 48 volts.

Low AC Power—When the power supply voltage drops below the battery voltage level, the battery 102 provides operating power to the system.

Serial Interface

A serial interface may be provided in the Controller 90 for remote testing system setup, system testing and diagnostics. The interface should be an RS-232 interface with a simple protocol for transmission of data.

Wireless Testing

A coded IR transmitter is preferably used to initiate a brief (one second) turn on of the Sign Board. The Sign Board 60 contains the IR receiver logic 63 for detecting the transmitted signal that starts the test.

Modem Support

The preferred Controller Board 90 provides a serial port to support communications with an external modem for remote testing and data communications.

Printer Support

The preferred Controller Board's serial port also supports communications to a serial interface printer, or an external computer, or a serial to parallel printer adapter. A single serial interface is shared between remote testing, modem interface and printer support.

Event Data Storage

The preferred Controller Board stores events for record keeping and troubleshooting and preferably has sufficient memory to support storage of about six months of event data. Accordingly, memory space for about 4,380 hourly status reports will be provided.

User Interface

The local user interface or display 200 needs to allow the operator to perform light detection calibration, system configuration, set up of test frequency, setup of light detection alarm delay, and system status. In addition, the user interface must support the selection of the Override function.

The preferred user interface, shown in FIG. 4, is a 16 character alphanumeric VFD 210 with four selection keys 201, 202, 203, 204 and two LEDs 205, 206. One of the four keys is a Mode Selection key 204 that allows the operator to select a specific mode status for display. A typical display might be "Light Level: 015" or "Test Int: 030" or "Low Battery". An Up key and Down key 201, 202 are used to alter values within the selected mode, if appropriate.

We claim:

1. An apparatus for indirectly monitoring illumination of a customer area associated with an automated teller machine (ATM) installation, the apparatus comprising:

a light sensor that directly monitors an area other than the customer area to measure the intensity of light emanating from a light source that illuminates the customer area, the light sensor generating a source intensity signal;

a controller that compares the source intensity signal with a minimum source intensity signal that was predetermined to correspond to a minimum level of illumination in the customer area; and a switch means for one of disabling the ATM and illuminating a warning sign if the source intensity signal is below the minimum source intensity signal that was predetermined to correspond to a minimum level of illumination in the customer area.

2. The apparatus of claim 1 wherein the controller comprises:

means for inputting an initial illumination value within the customer area owing only to the light source;

means for inputting a minimum illumination value;

means for measuring the intensity of light emanating from the light source under the same conditions used to measure the initial illumination value to generate an initial source intensity signal corresponding to the initial illumination value; and means for associating the initial source intensity signal with the initial illumination value and the minimum illumination value to derive the minimum source intensity signal.

3. The apparatus of claim 2 wherein the means for associating comprises:

means for determining a ratio between the initial illumination value and the minimum illumination value; and means for multiplying the initial source intensity signal by the ratio to derive the minimum source intensity signal.

4. The apparatus of claim 1 wherein the light source comprises first and second light sources that collectively illuminate the customer area and wherein the light sensor comprises first and second light sensors that separately monitor the intensity of the first and second light sources.

5. The apparatus of claim 1 wherein the light source comprises first and second light sources that collectively illuminate the customer area and wherein the light sensor comprises a single light sensor that monitors a combined intensity of light emanating from the first and second light sources.

6. The apparatus of claim 1 wherein the light sensor is located substantially adjacent to the light source.

7. The apparatus of claim 1 wherein the light sensor is located remotely from the light source and has a field of view which encompasses the light source.

8. The apparatus of claim 1 wherein the light sensor comprises a photodiode.

9. A method of indirectly monitoring illumination of a customer area associated with an automated teller machine (ATM) installation, the method comprising the steps of:
   monitoring an area other than the customer area to measure the intensity of light emanating from a light source which illuminates the customer area;
   generating a source intensity signal;
   comparing the source intensity signal with a minimum source intensity signal that was predetermined to correspond to a minimum level of illumination in the customer area; and
   one of disabling the ATM and illuminating a warning sign if the source intensity signal is below the minimum source intensity signal.

10. The method of claim 9 wherein the minimum source intensity signal used in the comparing step is predetermined with the steps of:
    illuminating the customer area with only the light source;
    measuring an initial illumination in the customer area to derive an initial illumination value;
    inputting the initial illumination value;
    inputting a minimum illumination value;
    measuring the intensity of light emanating from the light source under the same conditions used to measure the initial illumination value to generate an initial source intensity signal corresponding to the initial illumination value; and
    associating the initial source intensity signal with the initial illumination value and the minimum illumination value to derive the minimum source intensity signal.

11. The method of claim 10 wherein the associating step comprises the steps of:
    determining a ratio between the initial illumination value and the minimum illumination value; and
    multiplying the initial source intensity signal by the ratio to derive the minimum source intensity signal.

12. The method of claim 10 wherein the step of measuring an initial illumination in the customer area is accomplished with a hand-held light meter.

13. The method of claim 9 wherein the light source comprises first and second light sources that collectively illuminate the customer area and wherein the monitoring step is accomplished with first and second light sensors that separately monitor the intensity of the first and second light sources.

14. The method of claim 9 wherein the light source comprises first and second light sources that collectively illuminate the customer area and wherein the monitoring step is accomplished with a single light sensor that monitors a combined intensity of light emanating from the first and second light sources.

15. The method of claim 9 wherein the monitoring step is accomplished with a photodiode.

16. A light level monitoring and control system for use with an automated teller machine (ATM) having a user area that is illuminated by a light fixture, the control system comprising:
    a light sensor that monitors an area other than the user area for indirectly measuring light energy luminating from the light fixture into the user area and outputting a signal;
    an illuminated display operatively connected to a controller for warning a distant user that the ATM is disabled; and
    the controller including:
        means for inputting a measured value corresponding to a measured light reading in the user area when the area was illuminated by the light fixture;
        means for inputting a minimum light level;
        means for receiving the signal from the light sensor;
        calibration means for determining a minimum allowable signal from the light sensor which corresponds to the minimum light level based on the measured value, the minimum light level, and the signal from the light sensor;
        means for determining if the signal from the light sensor is below the minimum allowable signal;
        means for disabling the ATM if the signal from the light sensor is below the minimum allowable signal; and
        means for illuminating the display if the signal from the light sensor is below the minimum allowable signal.

17. The light level monitoring and control system of claim 16 wherein the controller further comprises means for detecting that the ATM is inoperative including means for detecting an absence of AC power and means for receiving a signal from the ATM indicative of an inoperative status.

18. The light level monitoring and control system of claim 17 wherein the controller further comprises means for illuminating the display when the detecting means detects that the ATM is inoperative.

19. The light level monitoring and control system of claim 17 further comprising a battery connected to the controller and the illuminated display so that the controller and lighted display continue to operate in the absence of AC power.

* * * * *